No. 753,594. PATENTED MAR. 1, 1904.
O. LAVALLÉE.
SPECTACLE TEMPLE.
APPLICATION FILED NOV. 20, 1903.
NO MODEL.

WITNESSES:
A. K. Hood.
C. L. Baker.

INVENTOR:
Olivier Lavallée.
By his Atty.
Henry W. Williams.

No. 753,594.

Patented March 1, 1904.

UNITED STATES PATENT OFFICE.

OLIVIER LAVALLÉE, OF BOSTON, MASSACHUSETTS.

SPECTACLE-TEMPLE.

SPECIFICATION forming part of Letters Patent No. 753,594, dated March 1, 1904.

Application filed November 20, 1903. Serial No. 181,938. (No model.)

*To all whom it may concern:*

Be it known that I, OLIVIER LAVALLÉE, a citizen of the United States, residing in Boston, in the county of Suffolk and State of Massachusetts, have invented a new and useful Improvement in Spectacle-Temples, of which the following is a specification.

A common complaint by wearers of spectacles is that the temples are uncomfortable, and particularly behind the ear, at which point they frequently irritate the skin and produce soreness.

My invention has for its principal object to obviate this difficulty and provide a temple which, while it is thin and narrow enough at its forward or straight portion to satisfy the public taste, is thick enough at its curved portion to avoid irritating the ear or the skin next the ear.

Other objects of the invention are to produce a separable temple whereby the curved part and the straight part can be separated and other corresponding parts substituted for either to produce a reversible temple, so that it may be used as a right or left temple, as desired, and to produce a temple which is strong and not liable to break at its curved portion.

The invention consists in the novel construction and arrangement of parts fully described below and illustrated in the accompanying drawings, in which—

Figure 1:
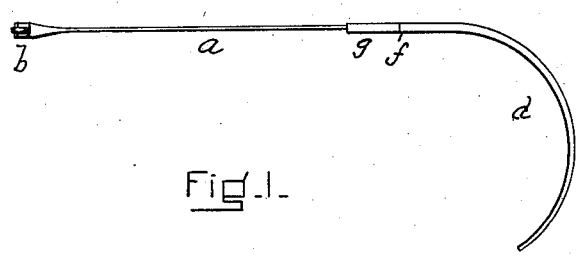
Figure 2:
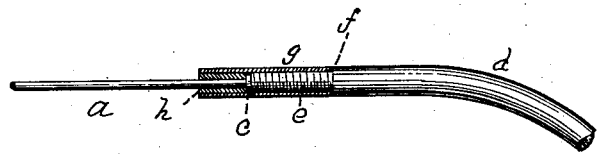

Figure 1 is a side elevation of a temple embodying my invention. Fig. 2 is an enlarged view, partly in side elevation and partly in section, of a portion of the temple.

Similar letters of reference indicate corresponding parts.

*a* represents the straight or side portion of a temple, made of small or thin wire, of gold or other metal, which is formed at its forward end at *b* in the usual manner for attachment to the bow or frame for the lens. The rear end of this portion *a* is headed, as shown in Fig. 2 at *c*.

*d* represents the curved portion of the temple, much larger in diameter than the portion *a* and made, preferably, of tortoise-shell or celluloid, although any other suitable material may be employed. The forward end of the curved portion *d* is straight and is extended into an externally-screw-threaded portion *e*, smaller in diameter than the portion *d*, whereby an annular shoulder is formed at *f*.

*g* represents a piece of tubing or a ferrule internally screw-threaded to fit the thread at *e* and provided at its outer end with a plug *h*, which is longitudinally bored to receive the portion *a*.

The parts are assembled in the manner indicated in Fig. 2, the portion *a* of the temple extending through the bore in the plug *h* and being kept from withdrawal by the head *c*. The portion *e* of the curved part of the temple is screwed into the tube or ferrule *g* against the head *c*, and thus the two parts of the temple are held rigidly and firmly together. The greater diameter of the portion *d* prevents the temple from cutting or irritating the skin behind the ear, the tight joint renders the temple as rigid as one made of an integral piece of wire, and the threaded joint renders the parts separable, so that they can be easily replaced in case of breakage, and allows of the use of the temple either on the right or the left side by making a half-rotation thereof.

Having thus fully described my invention, what I claim, and desire to secure by Letters Patent, is—

In a spectacle-temple, the forward straight portion of comparatively small diameter and provided at its rear end with the head *c;* and the rear curved ear portion *d* of comparatively large diameter and screw-threaded at its forward end; and the internally-screw-threaded ferrule *g* provided at its forward end with the longitudinally-bored plug *h*, whereby the portion *g* may be screwed into the ferrule and force said head against the inner end of the plug, the three said parts being of such relative length and position that the ferrule will be opposite the side of the face of the wearer, for the purpose set forth.

In testimony whereof I have signed my name to this specification in the presence of two subscribing witnesses.

OLIVIER LAVALLÉE.

Witnesses:
HENRY W. WILLIAMS,
A. K. HOOD.